US008369366B2

(12) United States Patent
Tojo et al.

(10) Patent No.: US 8,369,366 B2
(45) Date of Patent: Feb. 5, 2013

(54) SEMICONDUCTOR LASER EXCITED SOLID-STATE LASER DEVICE

(75) Inventors: Koji Tojo, Sagamihara (JP); Naoya Ishigaki, Atsugi (JP)

(73) Assignee: Shimadzu Corporation, Kyoto (JP)

( * ) Notice: Subject to any disclaimer, the term of this patent is extended or adjusted under 35 U.S.C. 154(b) by 25 days.

(21) Appl. No.: 12/734,624

(22) PCT Filed: Mar. 28, 2008

(86) PCT No.: PCT/JP2008/000789
§ 371 (c)(1),
(2), (4) Date: May 13, 2010

(87) PCT Pub. No.: WO2009/093289
PCT Pub. Date: Jul. 30, 2009

(65) Prior Publication Data
US 2010/0254413 A1 Oct. 7, 2010

(30) Foreign Application Priority Data
Jan. 25, 2008 (JP) ................................. 2008-014504

(51) Int. Cl.
*H01S 3/11* (2006.01)

(52) U.S. Cl. .............. 372/10; 372/11; 372/12; 372/13; 372/14; 372/15; 372/16; 372/17; 372/18; 372/19; 372/20

(58) Field of Classification Search .............. 372/10–22
See application file for complete search history.

(56) References Cited

U.S. PATENT DOCUMENTS

| 4,866,720 | A | * | 9/1989 | Holly ............................. 372/23 |
| 5,436,757 | A | | 7/1995 | Okazaki et al. |
| 5,850,407 | A | * | 12/1998 | Grossman et al. ............. 372/22 |
| 5,936,983 | A | * | 8/1999 | Yusong et al. ................. 372/22 |
| 6,697,391 | B2 | * | 2/2004 | Grossman et al. ............. 372/22 |
| 7,016,389 | B2 | | 3/2006 | Dudley et al. |
| 7,079,557 | B1 | * | 7/2006 | Yin et al. ........................ 372/22 |
| 7,801,188 | B2 | * | 9/2010 | Karlsson et al. ............... 372/22 |
| 2008/0075130 | A1 | | 3/2008 | Mizuuchi et al. |
| 2010/0220294 | A1 | * | 9/2010 | Mizuuchi et al. ............. 353/20 |
| 2010/0246615 | A1 | * | 9/2010 | Zhou et al. .................... 372/22 |

FOREIGN PATENT DOCUMENTS

| JP | 5-333395 | 12/1993 |
| WO | WO-2006/006701 | 1/2006 |

OTHER PUBLICATIONS

V. Ya. Shur et a., "Polarization reversal in congruent and stoichiometric lithium tantalate" Applied Physics Letters vol. 79, No. 19 Nov. 5, 2001, pp. 1-4.* D.S. Hum et. al., "Quasi-phase-matched second harmonic generation using 42° rotated Y-cut near-stoichiometric lithium tantalate", 2004 OSA/CLEO 2004, pp. 1-3.*

* cited by examiner

*Primary Examiner* — Jessica Stultz
*Assistant Examiner* — Delma R Forde
(74) *Attorney, Agent, or Firm* — Jordan and Hamburg LLP

(57) ABSTRACT

To make it possible to use a type I nonlinear optical crystal or a quasi phase matching element as a third harmonic generation crystal there is provided a semiconductor laser, a solid state laser medium that outputs a fundamental wave, a second harmonic generation crystal that outputs a second harmonic wave from the fundamental wave, and a third harmonic generation crystal that outputs a third harmonic wave from the fundamental wave and the second harmonic wave. A quasi phase matching elements is utilized as the second harmonic generation crystal. It is possible to use a type I nonlinear optical crystal or a quasi phase matching element as the third harmonic generation crystal.

1 Claim, 4 Drawing Sheets

FIG. 1    SEMICONDUCTOR LASER PUMPED SOLID STATE LASER APPARATUS
           100
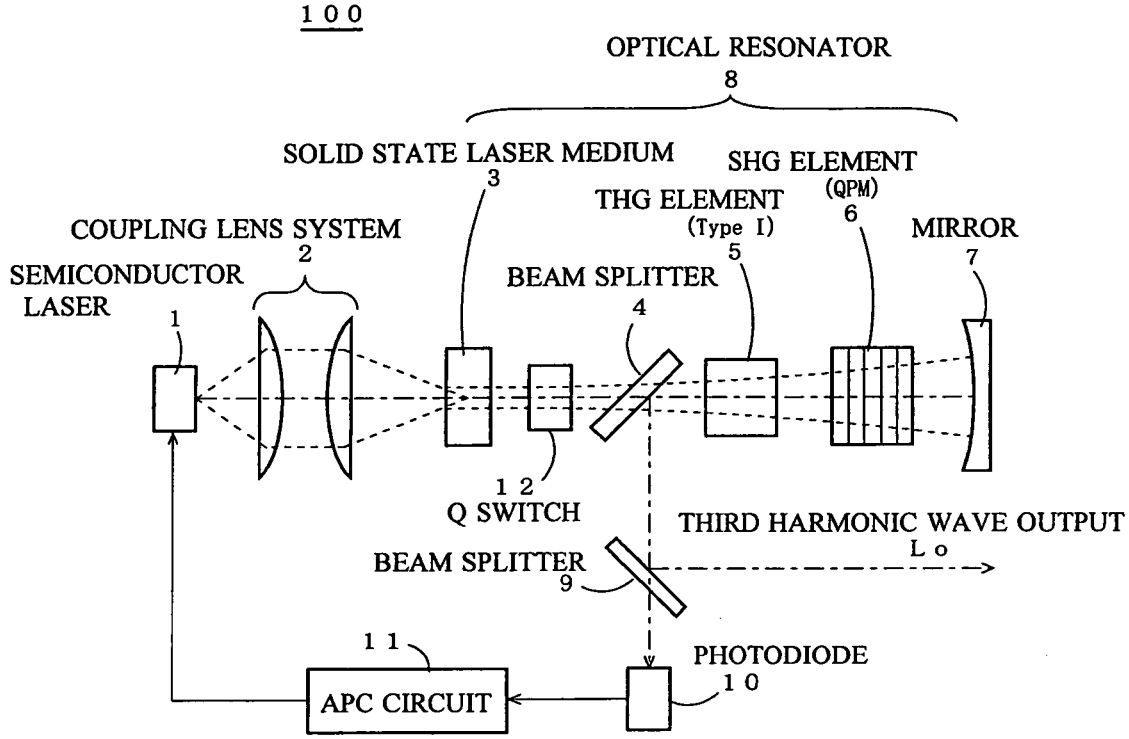
FIG. 2
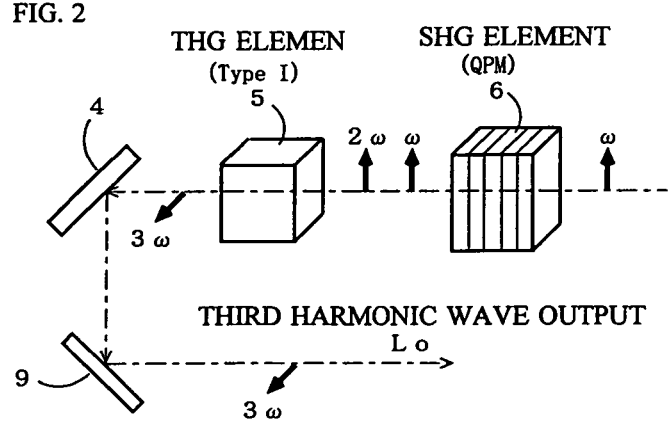

FIG. 5  SEMICONDUCTOR LASER PUMPED SOLID STATE LASER APPARATUS
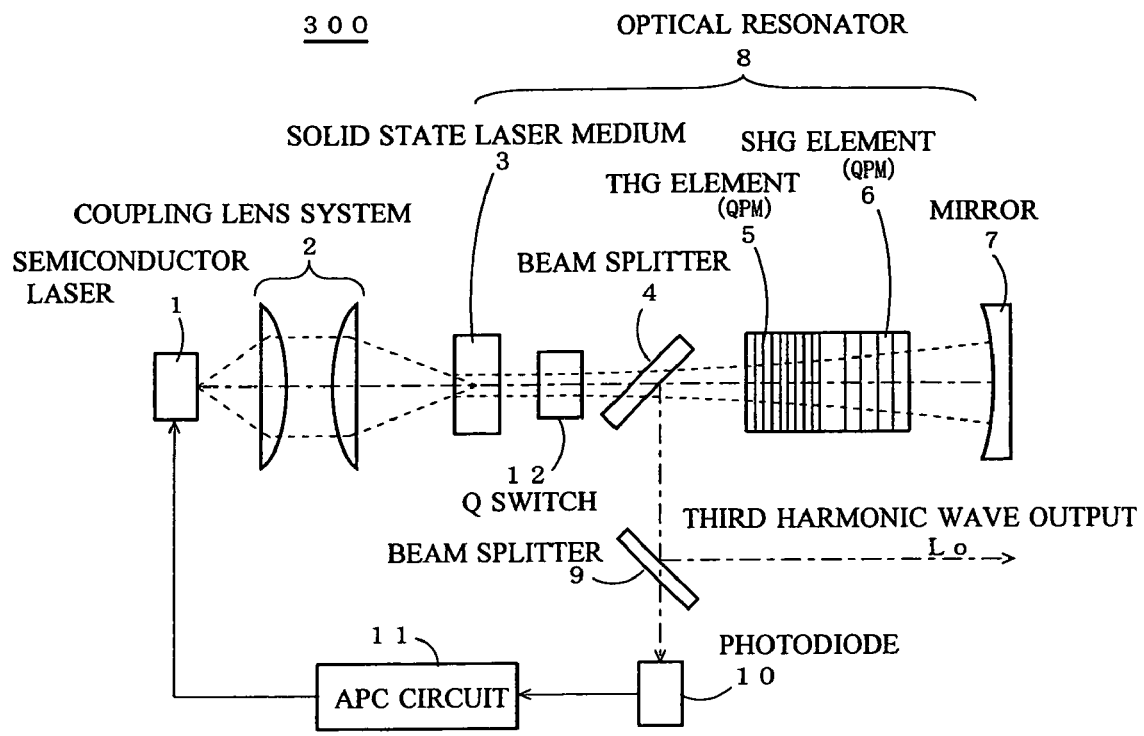
FIG. 6
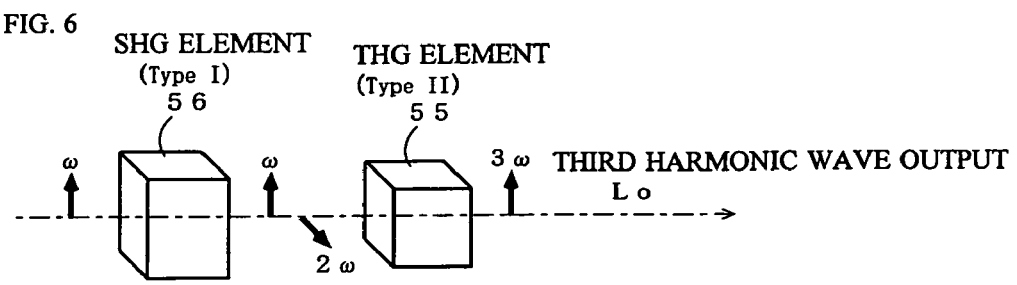

FIG. 7

TABLE 1

| MATERIAL | PHASE MATCHING SCHEME | EFFECTIVE NONLINEAR COEFFICIENT $d_{eff}$ pm/V |
|---|---|---|
| LBO | Type I | 0.75 |
|  | Type II | −0.53 |
| BBO | Type I | 2.02 |
|  | Type II | 1.29 |
| BIBO | Type I | 3.90 |
|  | Type II | 1.18 |
| YCOB | Type I | 0.67 |
|  | Type II | NOT APPLICABLE |
| PPSLT | QPM | 11 |

US 8,369,366 B2

SEMICONDUCTOR LASER EXCITED SOLID-STATE LASER DEVICE

TECHNICAL FIELD

The present invention relates to a semiconductor laser excited solid state laser device. More particularly, the present invention relates to a semiconductor laser excited solid state laser device in which it is possible to use a type I nonlinear optical crystal (a type I angle phase matching element using birefringence) or a quasi phase matching element (=QPM element) as a third harmonic generation crystal.

BACKGROUND OF THE INVENTION

Up until now, a semiconductor laser pumped solid state laser apparatus has been known, such as the one shown in FIG. 6, in which a second harmonic generation crystal (=SHG element) 56 and a third harmonic generation crystal (=THG element) 55 are aligned in an optical resonator for the fundamental wave (See Patent Document 1.). The second harmonic generation crystal 56 outputs a second harmonic wave $2\omega$ from a fundamental wave $\omega$. The third harmonic generation crystal 55 outputs a third harmonic wave $3\omega$ from the fundamental wave $\omega$ and the second harmonic wave $2\omega$.
[Patent Document 1] U.S. Pat. No. 7,016,389

In the above described conventional semiconductor laser pumped solid state laser apparatus, a type I nonlinear optical crystal is used as the SHG element 56 and a type II nonlinear optical crystal is used as the THG element 55. If a combination of nonlinear optical crystals other than the above combination is used in the optical resonator, for example, if a combination of type I crystal for SHG and a type I crystal for THG is used, it is necessary to mutually rotate the axes of the crystals by 45 degrees, which leads to a rotation of a polarization in the optical resonator due to the birefringence, resulting in an occurring of an unstable oscillation. For this reason, the nonlinear optical crystals that can be used are practically limited to the above combination.

In view of the above discussion, an object of the present invention is to provide a semiconductor laser pumped solid state laser apparatus in which it is possible to use a type I nonlinear optical crystal or a quasi phase matching element as the third harmonic generation crystal.

SUMMARY OF THE INVENTION

According to a first aspect of the present invention, there is provided a semiconductor laser pumped solid state laser apparatus comprising, within an optical resonator for a fundamental wave, a semiconductor laser (1) that oscillates a pumping laser light; a solid state laser medium (3) that outputs a fundamental wave by being pumped by the pumping laser light; a second harmonic generation crystal (6) that outputs a second harmonic wave from the fundamental wave; and a third harmonic generation crystal (5) that outputs a third harmonic wave from the fundamental wave and the second harmonic wave, wherein the second harmonic generation crystal (6) is a quasi phase matching element.

With the semiconductor laser pumped solid state laser apparatus according to the first aspect, polarization directions of the fundamental wave and the second harmonic wave are matched with each other because the quasi phase matching element is used as the second harmonic generation crystal (6). Therefore, it is possible to use a type I nonlinear optical crystal or a quasi phase matching element as the third harmonic generation crystal (5) without any special polarization manipulation, leading to a wide selection of the crystals.

According to a second aspect of the present invention, the third harmonic generation crystal (5) in the semiconductor laser pumped solid state laser apparatus according to the first aspect is a type I nonlinear optical crystal.

With the semiconductor laser pumped solid state laser apparatus according to the second aspect, the conversion efficiency can be enhanced if the type I nonlinear optical crystal has higher nonlinearity as a third harmonic generator. The effective nonlinear coefficients of typical crystals for the third harmonic generation are shown in Table 1 of FIG. 7. It can be confirmed from Table 1 that the type I nonlinear coefficients are larger than the type II nonlinear coefficients in these crystals.

According to a third aspect of the present invention, the third harmonic generation crystal (5) in the semiconductor laser pumped solid state laser apparatus according to the first aspect is a quasi phase matching element.

With the semiconductor laser pumped solid state laser apparatus according to the third aspect, the length of a crystal required for obtaining a necessary conversion efficiency can be shortened because the nonlinear coefficient of the quasi phase matching element is large, making it possible to shorten the length of a resonator. The shortening of the length of the resonator leads to a generation of a pulse with short width in the case of a pulse oscillation. An ultraviolet laser light having a short pulse width is useful in the MALDI TOF-MS or a high-precision processing application.

In addition, when the length of the resonator is shortened, such an effect is also expected as an enhancement of a temperature tolerance range of the quasi phase matching element, which is generally narrow.

According to a fourth aspect of the present invention, the second harmonic generation crystal (6) and the third harmonic generation crystal (5) in the semiconductor laser pumped solid state laser apparatus according to the third aspect are formed in a single element.

With the semiconductor laser pumped solid state laser apparatus according to the fourth aspect, the wavelength conversions into the second harmonic wave and the third harmonic wave can be performed in a consecutive manner by elaborating domain inverted regions of different periods in a monolithic form and providing the second harmonic generation crystal (6) and the third harmonic generation crystal (5) in a single element. Therefore, not only downsizing of the apparatus but also enhancement of the reliability can be expected.

According to a fifth aspect of the present invention, the quasi phase matching element in the semiconductor laser pumped solid state laser apparatus according to any one of the first aspect to the fourth aspect is a PPMgSLT that is a quasi phase matching element obtained by forming a periodic domain inversion structure in a magnesium doped stoichiometric LT.

With the semiconductor laser pumped solid state laser apparatus according to the fifth aspect, because the PPMgSLT that is a quasi phase matching element obtained by forming a polarization inversion structure in a Mg doped stoichiometric LT is used as the quasi phase matching element, the characteristics of the MgSLT, such as a high optical damage threshold and a transparency for the ultraviolet light, can be utilized in an effective manner.

With the semiconductor laser pumped solid state laser apparatus according to the present invention, it is possible to use a type I nonlinear optical crystal or a quasi phase matching element as a third harmonic generation crystal. In addition, a stable, compact, and highly efficient laser apparatus can be obtained.

Exemplary embodiments of the present invention will be explained in detail below with reference to the drawings. However, it should be noted that nothing in the embodiments shall be construed to limit the scope of the present invention.

BRIEF DESCRIPTION OF DRAWINGS

FIG. 1 is a schematic diagram of a semiconductor laser pumped solid state laser apparatus according to a first embodiment.

FIG. 2 is a schematic diagram showing polarization directions of a fundamental wave, a second harmonic wave, and a third harmonic wave in the semiconductor laser pumped solid state laser apparatus according to the first embodiment.

FIG. 5 is a schematic diagram of a semiconductor laser pumped solid state laser apparatus according to a third embodiment.

FIG. 6 is a schematic diagram showing polarization directions of a fundamental wave, a second harmonic wave, and a third harmonic wave in a semiconductor laser pumped solid state laser apparatus according to a comparative example.

FIG. 7 is a table showing effective nonlinear coefficients of typical crystals for a third harmonic generation.

Figure 3:
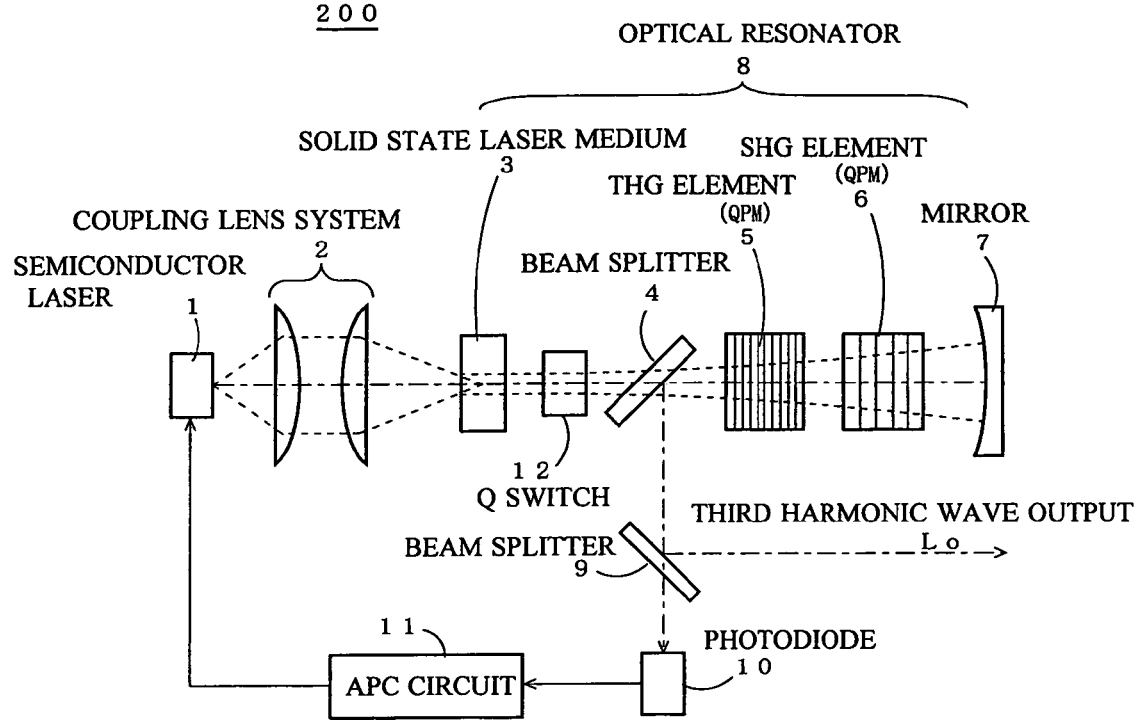
FIG. 3 is a schematic diagram of a semiconductor laser pumped solid state laser apparatus according to a second embodiment.

EXPLANATIONS OF NUMERALS 1 semiconductor laser
2 coupling lens
3 solid state laser medium
4 dichromic beam splitter
5 third harmonic generation crystal
6 second harmonic generation crystal
7 mirror
8 optical resonator
9 beam splitter
10 photo diode
11 APC circuit
12 Q switching element
100 semiconductor laser pumped solid state laser apparatus

DESCRIPTION OF THE PREFERRED EMBODIMENTS

FIG. 1 is a schematic diagram of a semiconductor laser pumped solid state laser apparatus 100 according to a first embodiment.

The semiconductor laser pumped solid state laser apparatus 100 includes a semiconductor laser 1, a coupling lens system 2, a solid state laser medium 3, a Q switching element 12, a dichroic beam splitter 4, a second harmonic generation crystal (=SHG element) 6, a mirror 7, a third harmonic generation crystal (=THG element) 5, a beam splitter 9, a photodiode 10, and an APC circuit 11. The semiconductor laser 1 oscillates a pumping laser light. The coupling lens system 2 couples the pumping laser light to the solid state laser medium 3. The solid state laser medium 3 outputs a fundamental wave by being pumped by the pumping laser light. The dichroic beam splitter 4 transmits the fundamental wave and a second harmonic wave, and reflects a third harmonic wave. The second harmonic generation crystal 6 generates the second harmonic wave from the fundamental wave. The mirror 7 reflects the fundamental wave and the second harmonic wave. The third harmonic generation crystal 5 generates the third harmonic wave by generating a sum frequency of the fundamental wave and the second harmonic wave coming from the second harmonic generation crystal 6. The beam splitter 9 reflects a portion of the third harmonic wave that is reflected by the dichroic beam splitter 4 as a third harmonic wave output Lo and transmits the other portion of the third harmonic wave. The photodiode 10 receives the third harmonic wave that has passed through the beam splitter 9. The APC circuit 11 drives the semiconductor laser 1 such that the energy, or the average power, of the third harmonic wave that is received by the photodiode 10 is maintained constant.

The semiconductor laser 1 is temperature-tuned, i.e., the temperature of the semiconductor laser 1 is controlled by using a Peltier element such that a wavelength of the pumping laser light is tuned at 808.5 nanometers.

The solid state laser medium 3 is, for example, Nd:YAG or Nd:YVO4. The Nd:YAG is a single crystal or a ceramic. An optical coating having a high transmissivity at the wavelength of the pumping laser light and a high reflectivity at the wavelength of the fundamental wave, for example, a wavelength of 1064 nanometers, is formed on a semiconductor laser side surface of the solid state laser medium 3. An AR coating is formed on an opposite side surface. The solid state laser medium 3 is mounted on a metal holder to facilitate heat radiation.

An optical resonator 8 is formed between the surface of the solid state laser medium 3 and the mirror 7. The optical resonator 8 oscillates the fundamental wave having a wavelength of, for example, 1064 nanometers.

An operation of the Q switching element 12 is actively performed by switching on and off an acousto-optic modulator (AOM) with an external signal.

The second harmonic generation crystal 6 is a quasi phase matching (QPM) element. The second harmonic generation crystal 6 is obtained by performing a polarization inversion process on LiNbO3, LiTaO3, MgO:LiNbO3, MgO:LiTaO3, KNbO3, KTiOPO4, and the like. The second harmonic generation crystal 6 is temperature-tuned to an appropriate value by a Peltier element or a heater.

The third harmonic generation crystal 5 is a type I nonlinear optical crystal, such as LBO, BBO, BIBO, YCOB, GdYCOB, and the like.

As shown in FIG. 2, the fundamental wave ω reflected at the mirror 7 passes through the second harmonic generation crystal 6 and it is converted into the second harmonic wave 2ω having a wavelength of, for example, 532 nanometers. Subsequently, the fundamental wave ω and the second harmonic wave 2ω coming from the second harmonic generation crystal 6 pass through the third harmonic generation crystal 5 and are converted into the third harmonic wave 3ω having a wavelength of, for example, 355 nanometers, which is the sum frequency of the fundamental wave and the second harmonic wave.

With the semiconductor laser pumped solid state laser apparatus 100 according to the first embodiment, the conversion efficiency can be enhanced because the type I nonlinear optical crystal is used as the third harmonic generation crystal 5.

Second Embodiment

FIG. 3 is a schematic diagram of a semiconductor laser pumped solid state laser apparatus 200 according to a second embodiment.

The semiconductor laser pumped solid state laser apparatus 200 has basically the same configuration as the semiconductor laser pumped solid state laser apparatus 100 according to the first embodiment except that the third harmonic generation crystal 5 is a quasi phase matching element (=QPM element) like the second harmonic generation crystal 6 is. The third harmonic generation crystal 5 is, for example, a PPMgSLT that is a quasi phase matching element obtained by forming a domain inverted structure in a magnesium doped stoichiometric LT.

Figure 4:
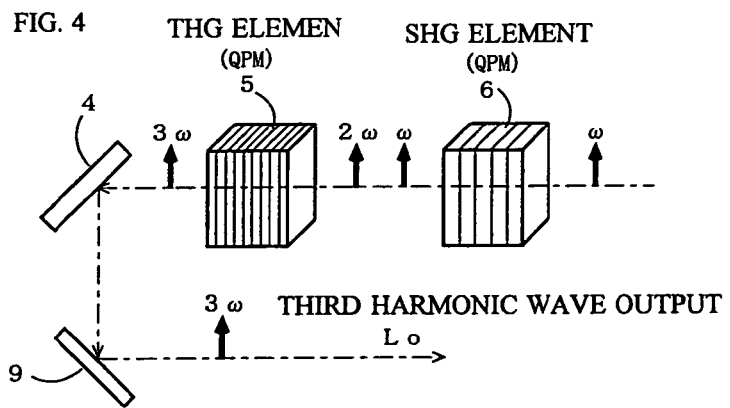
FIG. 4 is a schematic diagram showing polarization directions of a fundamental wave, a second harmonic wave, and a third harmonic wave in the semiconductor laser pumped solid state laser apparatus according to the second embodiment.

As shown in FIG. 4, the fundamental wave ω reflected at the mirror 7 passes through the second harmonic generation crystal 6 and it is converted into the second harmonic wave 2ω having a wavelength of, for example, 532 nanometers. Subsequently, the fundamental wave ω and the second harmonic wave 2ω coming from the second harmonic generation crystal 6 pass through the third harmonic generation crystal 5 and they are converted into the third harmonic wave 3ω having a wavelength of, for example, 355 nanometers, which is the sum frequency of the fundamental wave and the second harmonic wave.

With the semiconductor laser pumped solid state laser apparatus 200 according to the second embodiment, the selection range of the crystals and the applicable wavelength range are increased and the manufacturing cost can be reduced because the quasi phase matching element is used as the third harmonic generation crystal 5. In addition, it also attributes to a decrease in the length of the optical resonator, which makes it possible to generate a short pulse.

Third Embodiment

FIG. 5 is a schematic diagram of a semiconductor laser pumped solid state laser apparatus 300 according to a third embodiment.

The semiconductor laser pumped solid state laser apparatus 300 has basically the same configuration as the semiconductor laser pumped solid state laser apparatus 200 according to the second embodiment except that domain inverted structures of different periods are elaborated in a monolithic form so that the second harmonic generation crystal 6 and the third harmonic generation crystal 5 are provided in a single element.

With the semiconductor laser pumped solid state laser apparatus 300 according to the third embodiment, the wavelength conversions into the second harmonic wave and the third harmonic wave can be performed in a consecutive manner. Therefore, not only downsizing of the apparatus but also enhancement of the reliability can be expected.

The semiconductor laser pumped solid state laser apparatus according to the present invention is suitable for applications in fields of, for example, the bioengineering and the measurement.

The invention claimed is:

1. A semiconductor laser excited solid state laser device comprising:
   a semiconductor laser that oscillates a pumping laser light;
   a solid state laser medium that outputs a fundamental wave by being pumped by the pumping laser light;
   a Q switch element;
   a second harmonic generation crystal that outputs a second harmonic wave from the fundamental wave; and
   a third harmonic generation crystal that outputs a third harmonic wave from the fundamental wave and the second harmonic wave; and
   wherein the second harmonic generation crystal is a PPMgSLT that is a quasi phase matching element obtained by forming a polarization inversion structure in a magnesium doped stoichiometric LT;
   wherein the third harmonic generation crystal is a type I nonlinear optical crystal; and
   wherein laser light traverses a path between the third harmonic generation crystal and the second harmonic generation crystal without polarization manipulation along said path therebetween.

* * * * *